United States Patent
Graham

[11] Patent Number: 5,826,448
[45] Date of Patent: Oct. 27, 1998

[54] AIR BAG AND STEERING LOCK DEVICE

[76] Inventor: Kenneth L. Graham, 500 J. K. St., Searcy, Ark. 72143

[21] Appl. No.: 698,352

[22] Filed: Aug. 15, 1996

[51] Int. Cl.⁶ .................................................. B60R 25/02
[52] U.S. Cl. ............................... 70/209; 70/417; 70/237; 70/227; 70/18
[58] Field of Search .................... 70/53, 227, 233, 70/236, 417, 18, 19, 238, 237, 209

[56] References Cited

U.S. PATENT DOCUMENTS

| | | | |
|---|---|---|---|
| 512,980 | 1/1894 | Lowrie | 70/53 |
| 1,262,656 | 4/1918 | Fisher | 70/236 |
| 1,400,415 | 12/1921 | Callahan | 70/227 |
| 1,428,649 | 9/1922 | Miller | 70/236 |
| 1,437,717 | 12/1922 | Brindamour | 70/227 |
| 1,438,102 | 12/1922 | Dunlap | 70/236 |
| 1,443,824 | 1/1923 | Pottinger | 70/227 |
| 3,811,303 | 5/1974 | Robertson | 70/237 |
| 4,020,662 | 5/1977 | Fowler | 70/18 |
| 4,098,102 | 7/1978 | Kalina | 70/237 |
| 4,134,279 | 1/1979 | Ross et al. | 70/18 |
| 4,598,562 | 7/1986 | Freeman | 70/237 |
| 4,726,207 | 2/1988 | Gifford | 70/237 |
| 4,955,215 | 9/1990 | Eremita | 70/18 |
| 5,036,683 | 8/1991 | Geuvjehizian | 70/18 |
| 5,113,674 | 5/1992 | LiCausi | 70/18 |
| 5,461,891 | 10/1995 | Noel | 70/18 |

*Primary Examiner*—Darnell M. Boucher

[57] ABSTRACT

An air bag and steering lock device including a housing. The housing has a top half and a bottom half that allows the housing to be positioned around a column of a steering wheel for replacing the covering of the column. A J-bar member is provided. The J-bar has a back bar with a pair of lateral extents projecting in a forward direction. One of the lateral extents has an interior side with a plurality of catch slots adjacent an end. Lastly, a locking means is fixedly attached to the top surface of the top half of the housing. The locking means is capable of receiving the one lateral extent of the J-bar for locking the J-bar over the steering wheel to limit the steering wheel's movement and disassembly.

1 Claim, 3 Drawing Sheets

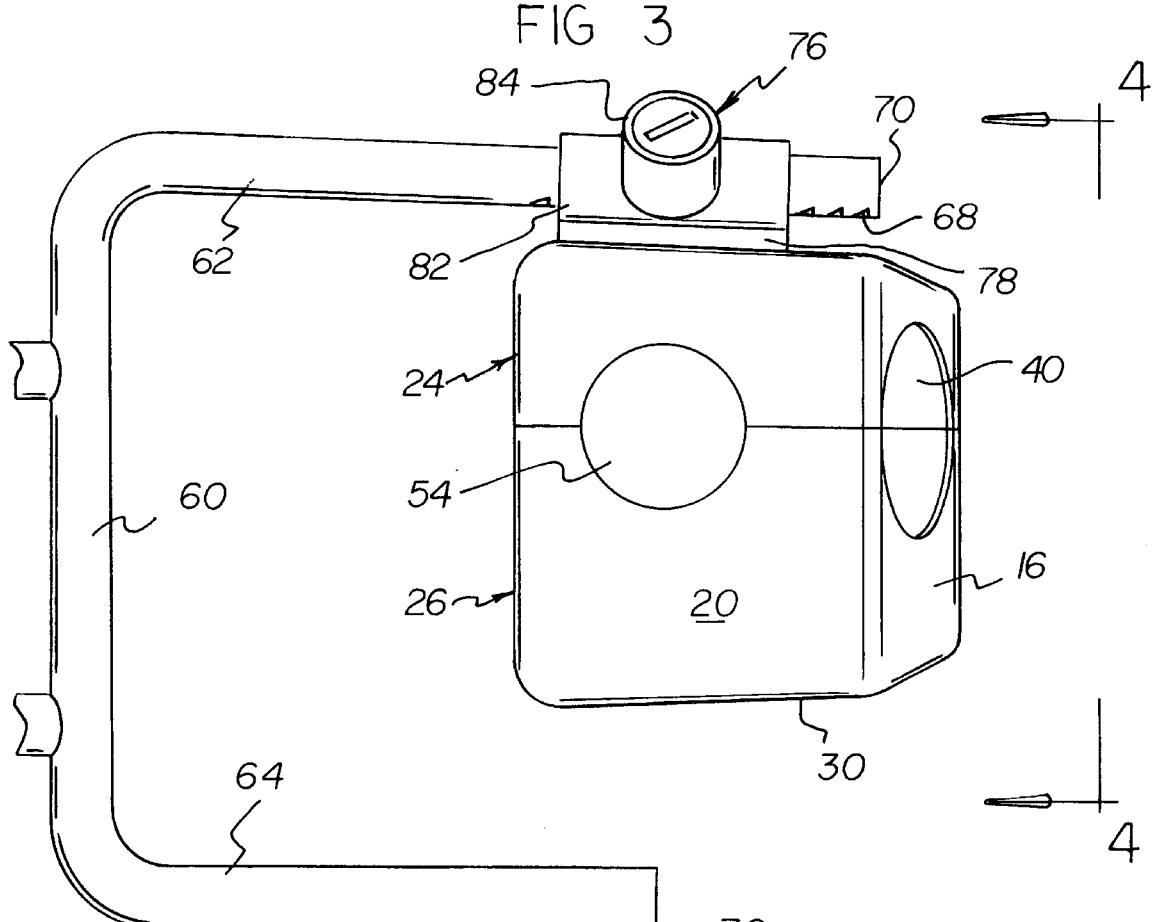
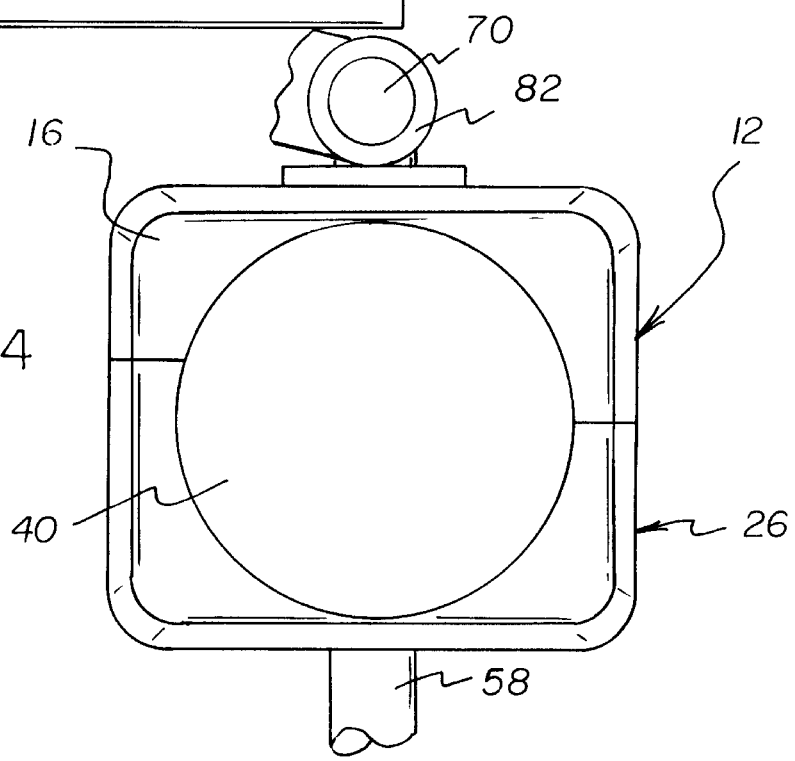

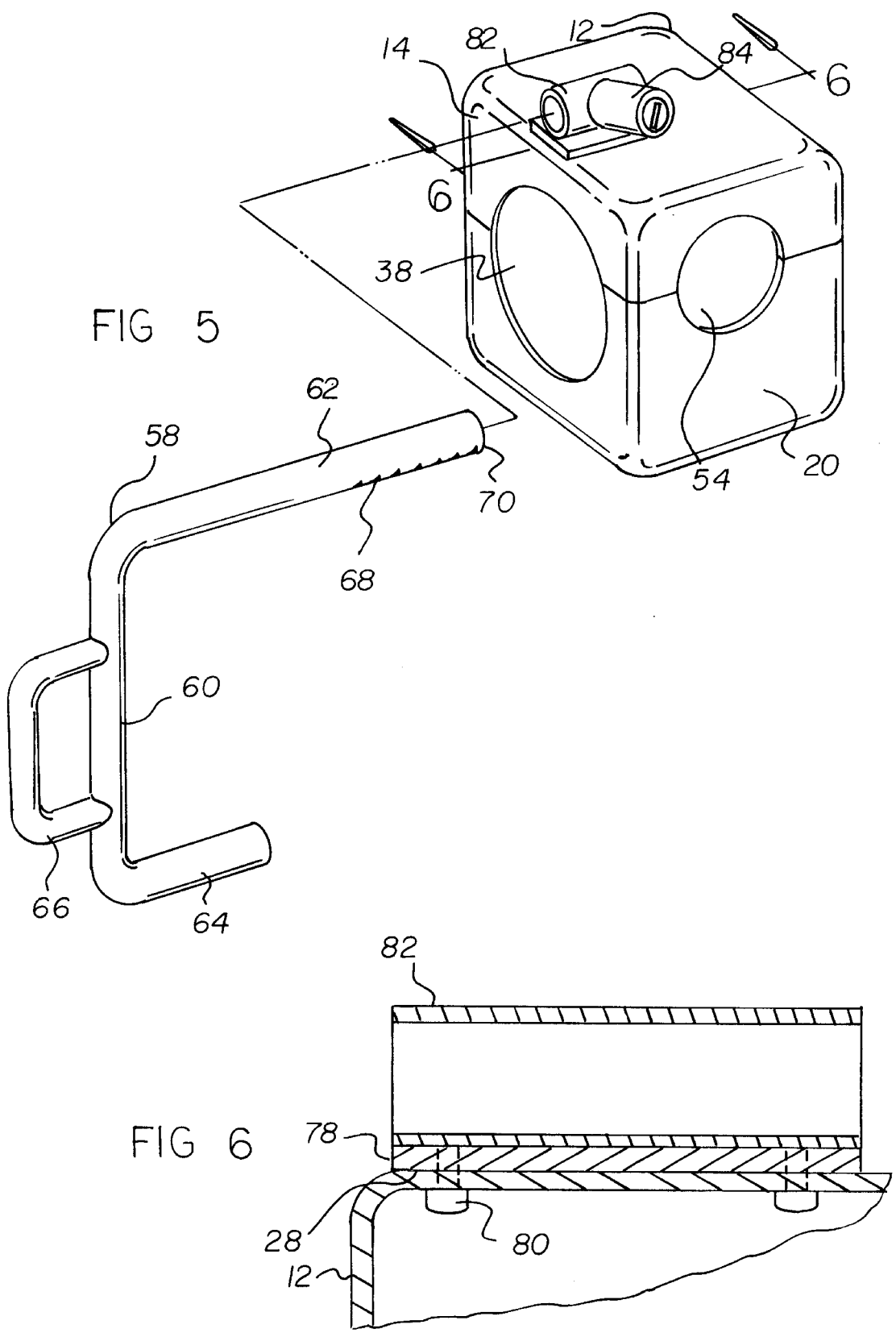

AIR BAG AND STEERING LOCK DEVICE

BACKGROUND OF THE INVENTION

1. Field of the Invention

The present invention relates to an air bag and steering lock device and more particularly pertains to providing a securing device that has a housing for the column and a J-bar that locks to the housing to secure the steering wheel and the air bag contained within the steering wheel.

2. Description of the Prior Art

The use of a steering wheel anti-theft device is known in the prior art. More specifically, Steering wheel anti-theft devices heretofore devised and utilized for the purpose of preventing vehicle and air bag theft are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,381,679 to Cummins discloses a vehicle steering wheel anti-theft device. U.S. Pat. No. Des. 350,472 to White, Gonzalez and Ding discloses an anti-theft steering wheel lock. U.S. Pat. No. 5,275,030 to Cole discloses a steering wheel mounted anti-theft device for vehicles. U.S. Pat. No. 5,113,674 to LiCausi discloses an anti-theft device adapted to be mounted ot the steering wheel of a vehicle. U.S. Pat. No. 4,750,380 to Hoblingre and Barnabe discloses an anti-theft device for the steering column of a motor vehicle. Lastly, U.S. Pat. No. 4,304,111 to Nolin discloses a steering wheel cross lock.

While these devices fulfill their respective, particular objectives and requirements, the aforementioned patents do not describe air bag and steering lock device that allows the column covering to be replaced with a housing that has a locking means attached and capable of engaging a J-bar for securing the steering wheel and air bag.

In this respect, the air bag and steering lock device according to the present invention substantially departs from the conventional concepts and designs of the prior art, and in doing so provides an apparatus primarily developed for the purpose of providing a securing device that has a housing for the column and a J-bar that locks to the housing to secure the steering wheel and the air bag contained within the steering wheel.

Therefore, it can be appreciated that there exists a continuing need for a new and improved air bag and steering lock device which can be used for providing a securing device that has a housing for the column and a J-bar that locks to the housing to secure the steering wheel and the air bag contained within the steering wheel. In this regard, the present invention substantially fulfills this need.

SUMMARY OF THE INVENTION

In view of the foregoing disadvantages inherent in the known types of steering wheel anti-theft devices now present in the prior art, the present invention provides an improved air bag and steering lock device. As such, the general purpose of the present invention, which will be described subsequently in greater detail, is to provide a new and improved air bag and steering lock device and method which has all the advantages of the prior art and none of the disadvantages.

To attain this, the present invention essentially comprises a generally rectangular housing. The housing has a top half with a top surface and a bottom half with a bottom surface. The housing is capable of replacing a covering of a column of a steering wheel. Each half has a front wall and a rear wall with each wall having a semi-circular member cut therein. Each half of the housing is joined for allowing each semi-circular member to form a front opening and a rear opening through each respective wall thereof. The front opening and the rear opening of housing allow the column to be extended through the housing when positioned therearound. A J-bar member is provided. The j-bar member has a back bar with a pair of lateral extents projecting in a forward direction. The back bar has a handle portion fixedly attached thereto and extending rearwardly. One of the pair of lateral extents has a length greater than a length of another of the lateral extents. The one lateral extent has an interior side with a plurality of catch slots adjacent an end. Lastly, a locking means is included. The locking means has a plate member that is fixedly attached to the top surface of the top half of the housing. The locking means has a receiving tube attached to the plate. The receiving tube has an cylindrical locking mechanism coupled thereto. The receiving tube is capable of receiving the one lateral extent of the J-bar for locking the J-bar over the steering wheel. The J-bar is lockingly coupled with the receiving tube of the housing when the housing is over the column. The J-bar, when positioned over the steering wheel, is locked within the locking means by the cylindrical locking mechanism, the cylindrical locking mechanism engages the catch slots for allowing the J-bar to limit the steering wheel's movement and disassembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air bag and steering lock device which has all of the advantages of the prior art steering wheel anti-theft devices and none of the disadvantages.

It is another object of the present invention to provide a new and improved air bag and steering lock device which may be easily and efficiently manufactured and marketed.

It is further object of the present invention to provide a new and improved air bag and steering lock device which is of durable and reliable constructions.

An even further object of the present invention is to provide a new and improved air bag and steering lock device which is susceptible of a low cost of manufacture with regard to both materials and labor, and which accordingly is then susceptible of low prices of sale to the consuming public, thereby making such air bag and steering lock device economically available to the buying public.

Even still another object of the present invention is to provide an air bag and steering lock device for providing a securing device that has a housing for the column and a J-bar that locks to the housing to secure the steering wheel and the air bag contained within the steering wheel.

Lastly, it is an object of the present invention to provide a new and improved air bag and steering lock device including a housing. The housing has a top half and a bottom half that allows the housing to be positioned around a column of a steering wheel for replacing the covering of the column. A J-bar member is provided. The J-bar has a back bar with a pair of lateral extents projecting in a forward direction. One of the lateral extents has an interior side with a plurality of catch slots adjacent an end. Lastly, a locking means is fixedly attached to the top surface of the top half of the housing. The locking means is capable of receiving the one lateral extent of the J-bar for locking the J-bar over the steering wheel to limit the steering wheel's movement and disassembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the present invention in an operable orientation configuration.

FIG. 4 is a rear view of the present invention taken along line 4—4 of FIG. 3.

FIG. 5 is an exploded view of the present invention of FIG. 2.

FIG. 6 is a cross-sectional view of the present invention taken along line 6—6 of FIG. 5.

The same reference numerals refer to the same parts through the various Figures.

DESCRIPTION OF THE PREFERRED EMBODIMENT

Figure 1:
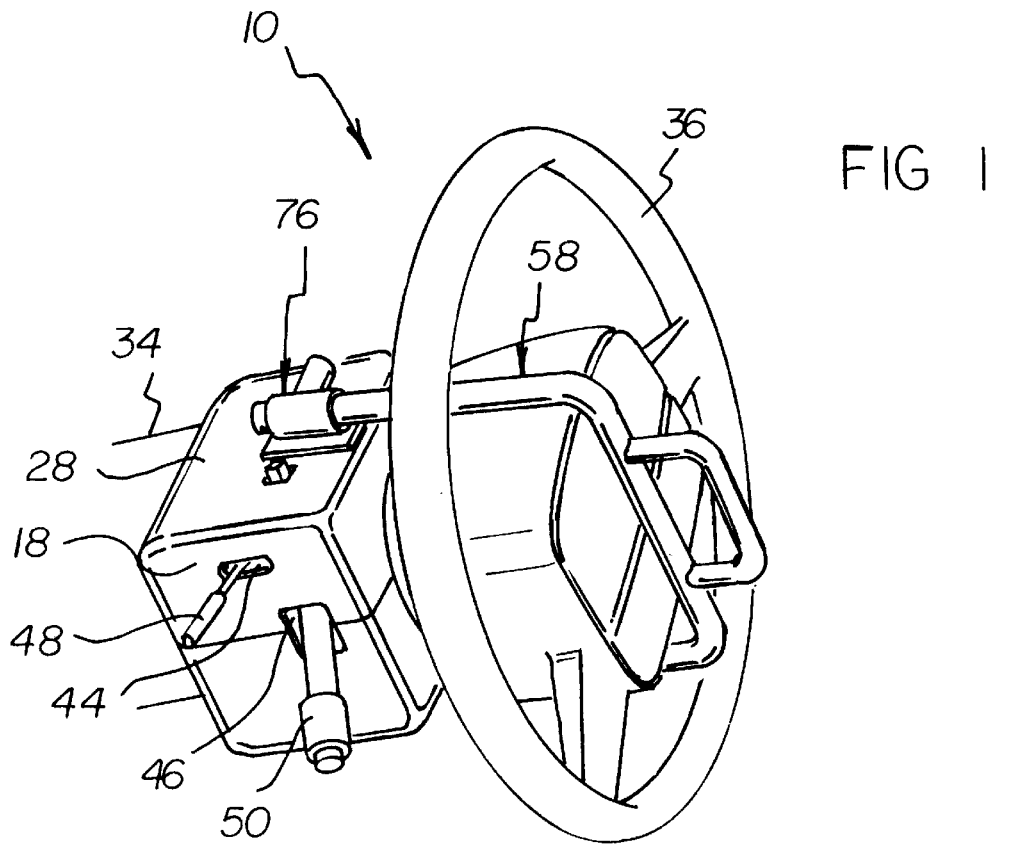
FIG. 1 is a perspective view of the preferred embodiment of the air bag and steering lock device constructed in accordance with the principles of the present invention.

With reference now to the drawings, and in particular to FIG. 1 thereof, the preferred embodiment of the new and improved air bag and steering lock device embodying the principles and concepts of the present invention and generally designated by the reference numeral 10 will be described.

The present invention, the air bag and steering lock device 10 is comprised of a plurality of components. Such components in their broadest context include a housing, a J-bar and a locking means. Such components are individually configured and correlated with respect to each other so as to attain the desired objective.

Specifically, the present invention includes a generally rectangular housing 12. The housing is formed of a rigid plastic or metal. The housing has a front wall 14, a rear wall 16, a left side wall 18 and a right side wall 20. The housing can be separated into a top half 24 and a bottom half 26. The top half of the housing has a top surface 28 with a slot 29 and a bottom half has a bottom surface 30. As seen in FIG. 1, the housing, because it is separable, can be placed around the column 34 of a steering wheel 36. The housing of the present invention replaces a covering that came standard with the column of the steering wheel.

Also, dividing the housing into separate halves allows each half of the housing 12 to have a front wall 14 and a rear wall 16. The rear wall is best illustrated in FIG. 3. When the housing is divided, each wall of each half has a semi-circular member cut therein. Joining each half of the housing allows each semi-circular member of the front wall and each semi-circular member of the rear wall to join. Joining the semi-circular members of the front wall form a front opening 38. Joining the semi-circular members of the rear wall from a rear opening 40. The opening of the front wall and the opening of the rear wall of housing allow the column to be extended through the housing.

Additionally, the left side 18 of the housing has an upper opening 44 and a lower opening 46. The upper opening, when the housing is around the column will accommodate the light dimmer switch 48. The lower opening, when the housing is around the column will accommodate the turn signal 50. The right side of the housing has an opening 54 that is smaller than the front opening and the rear opening. The opening of the right side will accommodate the gear shift lever.

Figure 2:
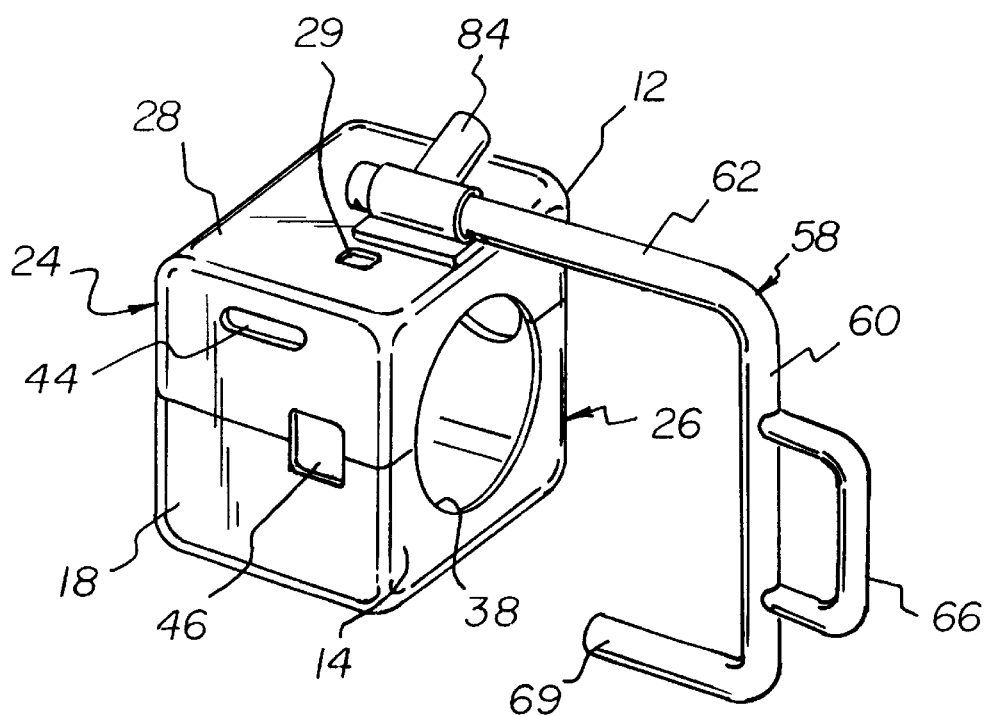
FIG. 2 is an isometric view of the air bag and steering lock device in an operable configuration.

As best illustrated in FIG. 2, a J-bar 58 member is included. The J-bar has a back bar 60 with a pair of lateral extents 62 and 64. The pair of lateral extents project in a forward direction. The back bar has a handle portion 66, as seen in FIG. 5. The handle portion is fixedly attached to back bar and extend rearwardly. One of the pair of lateral extents has a length greater than a length of another 64 of the lateral extents. The one lateral extent 62 has an interior side with a plurality of catch slots 68 adjacent an end 70. The J-bar and handle are both steel with a rubberized coating.

Lastly, a locking means 76 is provided. The locking means has a plate member 78 that is fixedly attached to the top surface of the top half of the housing with a pair of torqued screws 80. The locking means has a receiving tube 82 attached to the plate. The receiving tube has an cylindrical locking mechanism 84 coupled to one side of the tube. The receiving tube is capable of receiving the one lateral extent 62 of the J-bar to lock the J-bar over the steering wheel 36. The J-bar is lockingly coupled with receiving tube of the housing when the housing is over the column. The J-bar, when positioned over the steering wheel, is locked within the locking means by the cylindrical locking mechanism 84 engaging the catch slots. The J-bar, when locked over the sheering wheel, will limit the steering wheel's movement and disassembly. Finally, the J-bar, when placed over the steering wheel, will prevent the air bag in side the steering wheel from being removed.

The present invention air bag and steering lock device is an anti-theft device for motor vehicles. Designed to lock onto the steering column and secure over the steering wheel. The device of the present invention is comprised of two major components; a housing with a locking means attached and a J-bar. The housing is positioned over the column when the factory column is removed. The J-bar is placed over the center of the steering wheel and has one of its extents locked within the locking means. Once the J-bar is locked in position, the steering wheel has limited movement. Also, the air bag contained within the steering wheel is secured by the J-bar. The locking means has a cylindrical locking mechanism that is requires a key for locking and unlocking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air bag and steering lock device for securing to a steering wheel for the prevention of vehicle theft comprising in combination:

a generally rectangular housing having a top half with a top surface and a bottom half with a bottom surface, the housing having a left side wall and a right side wall, the housing being capable of replacing a covering of a column of a steering wheel, the top half of the housing having a slot, each half having a front wall and a rear wall with each wall having a semi-circular member cut therein, each half of the housing being joined for allowing each semi-circular member to form a front opening and a rear opening through each respective wall thereof, the front opening and the rear opening of the housing allows the column to be extended through the housing when positioned therearound;

the left side wall of the housing having an upper opening and a lower opening, the upper opening, when the housing is covering the column will accommodate a light dimmer switch, the lower opening, when the housing is covering the column will accommodate a turn signal, the right side wall of the housing has an opening being smaller than the front opening and the rear opening, the opening of the right side will accommodate a gear shift lever;

a J-bar member with a back bar having a pair of lateral extents projecting in a forward direction therefrom, the back bar having a handle portion fixedly attached thereto and extending rearwardly therefrom, one of the pair of lateral extents having a length greater than a length of another of the lateral extents, the one lateral extent having an interior side with a plurality of catch slots adjacent an end thereof; and a locking means having a plate member being fixedly attached to the top surface of the top half of the housing, the locking means having a receiving tube attached to the plate, the receiving tube having an cylindrical locking mechanism coupled thereto, the receiving tube being capable of receiving the one lateral extent of the J-bar for locking the J-bar over the steering wheel, the J-bar being lockingly coupled with the receiving tube of the housing when the housing is over the column, the J-bar when positioned over the steering wheel is locked within the locking means by the cylindrical locking mechanism, the cylindrical locking mechanism engages the catch slots for allowing the J-bar to limit the steering wheel's movement and disassembly and removal of an air bag within the steering wheel.

* * * * *